United States Patent
Beaudoin et al.

[11] Patent Number: 6,047,250
[45] Date of Patent: Apr. 4, 2000

[54] SYSTEM FOR MONITORING FLUID DISTRIBUTION AND ASSOCIATED METHODS

[75] Inventors: Benoit Beaudoin, Newport, Vt.; Pierre Biron, Bromptonville, Canada; Stephen D. Childs, Ft. Myers, Fla.; John R. Hendricks, Ft. Myers, Fla.; Sandy N. Moore, Ft. Myers, Fla.

[73] Assignee: Management and Report Technologies, Inc., Ft. Myers, Fla.

[21] Appl. No.: 08/954,315

[22] Filed: Oct. 17, 1997

Related U.S. Application Data

[63] Continuation-in-part of application No. 08/840,571, Apr. 21, 1997.

[51] Int. Cl.⁷ ............................................. G06F 15/20
[52] U.S. Cl. ........................................ 702/188; 455/4.1
[58] Field of Search ........................... 702/188; 455/4.1; 340/870.02

[56] References Cited

U.S. PATENT DOCUMENTS

| | | | |
|---|---|---|---|
| 3,662,924 | 5/1972 | Crandall et al. | 222/64 |
| 4,067,061 | 1/1978 | Juhasz | 364/900 |
| 4,223,217 | 9/1980 | Bongard et al. | 250/227 |
| 4,249,794 | 2/1981 | Haley | 360/96.2 |
| 4,313,168 | 1/1982 | Stephens et al. | 364/465 |
| 4,556,280 | 12/1985 | Bagby | 350/96.16 |
| 4,658,371 | 4/1987 | Walsh et al. | 364/550 |
| 4,882,499 | 11/1989 | Luukkala et al. | 250/577 |
| 4,885,943 | 12/1989 | Tootell et al. | 76/861.77 |
| 4,887,469 | 12/1989 | Shoptaw | 73/861.77 |
| 4,891,990 | 1/1990 | Khalifa et al. | 73/861.24 |
| 4,897,642 | 1/1990 | DiLullo et al. | 340/825 |
| 5,065,003 | 11/1991 | Wakatsuki et al. | 235/472 |

(List continued on next page.)

OTHER PUBLICATIONS

Mobile Computing Corporation, annual report 1995 "Wireless information system for the trucking industry".

Mobile Computing Corporation, "Oil and propane marketers".

APC Currents.

OPIS Alerts pp. 5, dtd Aug. 26, 1997.

*Primary Examiner*—Marc S. Hoff
*Assistant Examiner*—Linh Nguyen
*Attorney, Agent, or Firm*—Allen, Dyer, Doppelt, Milbrath & Gilchrist, P.A.

[57] ABSTRACT

A system and associated methods for monitoring fluid distribution for heavy duty vehicles are provided. The system advantageously includes a first handheld RF data communications terminal. The handheld data terminal preferably includes a portable housing readily adapted to be positioned in the hand of a driver of a heavy duty vehicle and a first RF transceiver connected to the portable housing for transmitting and receiving RF data communications to thereby interface with a heavy duty vehicle driver to collect data from customer fluid delivery locations. The system also includes at least one heavy duty vehicle adapted to transport fluid and a second vehicle data communications terminal preferably mounted to the at least one heavy duty vehicle. The second data communications terminal preferably includes a second RF transceiver for transmitting and receiving RF data communications. The system additionally includes at least one fluid storage tank positioned at a customer fluid delivery location for receiving and storing fluid transported by the heavy duty vehicle. The fluid storage tank includes a tank identifier for identifying the tank and adapted to be received by the data collection device of the first handheld data collection terminal. The system further includes a main office data monitoring and dispatching data terminal is associated with a main office.

37 Claims, 5 Drawing Sheets

U.S. PATENT DOCUMENTS

| | | | |
|---|---|---|---|
| 5,129,025 | 7/1992 | Loftus et al. | 385/88 |
| 5,154,314 | 10/1992 | Van Wormer | 222/1 |
| 5,204,819 | 4/1993 | Ryan | 364/465 |
| 5,228,469 | 7/1993 | Otten et al. | 137/80 |
| 5,265,032 | 11/1993 | Patel | 364/509 |
| 5,359,522 | 10/1994 | Ryan | 364/465 |
| 5,394,136 | 2/1995 | Lammers et al. | 340/439 |
| 5,420,797 | 5/1995 | Burns | 364/479 |
| 5,541,398 | 7/1996 | Hanson | 235/472 |
| 5,550,738 | 8/1996 | Bailey et al. | 364/424.04 |
| 5,579,233 | 11/1996 | Burns | 364/479.1 |
| 5,586,050 | 12/1996 | Makel et al. | 364/509 |
| 5,650,930 | 7/1997 | Hagenbuch | 364/421.07 |
| 5,700,999 | 12/1997 | Streicher et al. | 235/381 |
| 5,799,249 | 8/1998 | Kennedy, III et al. | 455/411 |
| 5,803,043 | 9/1998 | Bayron et al. | 123/335 |
| 5,826,195 | 10/1998 | Westerlage et al. | 455/456 |

6,047,250

SYSTEM FOR MONITORING FLUID DISTRIBUTION AND ASSOCIATED METHODS

RELATED APPLICATIONS

This application is a continuation-in-part of U.S. patent application Ser. No. 08/840,571 filed on Apr. 21, 1997 and which is incorporated herein by reference in its entirety.

FIELD OF THE INVENTION

The present invention relates to the field of fluid distribution systems and, more particularly, to systems for controlling fluid distribution.

BACKGROUND OF THE INVENTION

Over the years, technology has been slow to develop for heavy duty vehicles for various reasons. For example, much of the technology involves heavy mechanical systems which can be difficult to translate to electronic software based systems. Also, there have been little or no standards in electronic systems for these types of vehicles. Further, many of these heavy duty vehicles include tractor/trailers-type vehicles or trucks which often involve an owner who owns a fleet of these vehicles. Accordingly, because these vehicles are often already on the road or in use, it can be expensive and difficult to retrofit existing vehicles. Meanwhile, manufacturers of new vehicles also are hesitant to install advanced equipment because of the expense and the fear of acceptance by drivers and others in the industry.

Nevertheless, some data communications standards for heavy duty vehicles have arisen over the years, such as Society of Automotive Engineering ("SAE") standard J1708 and SAE standard J1939. Accordingly, more and more electronic and software systems are slowly being accepted. The fluid distribution industry, however, has been even more slow to accept these technology changes. For example, not only for the reasons set forth above exist, but these industries also often involve potentially dangerous or explosive materials, e.g., petroleum based fuels, which emit fumes that can readily ignite if an electrical spark or other type of spark initiates surrounding fumes.

Some data communications systems for heavy duty vehicles that have been adopted include built in data communication terminals mounted in the cab of heavy duty tractor trailer vehicles. Examples of such systems can be seen in U.S. Pat. No. 4,313,168 by Stephens et al. titled "Fluid Register System," U.S. Pat. No. 5,204,819 by Ryan titled "Fluid Delivery Control Apparatus," and U.S. Pat. No. 5,359,522 by Ryan titled "Fluid Delivery Control Apparatus." These prior patents, however, fail to appreciate the need for systematic monitoring and controlling of fuel distribution and data communications for such distribution and fail to appreciate the need for careful handling of such data communication systems especially in potentially explosive or environmentally hazardous fluid distribution environments. Further, these prior systems also fail to appreciate driver constraints when receiving instructions for deliveries, making deliveries, and loading and unloading fluid at various delivery and receiving sites.

SUMMARY OF THE INVENTION

In view of the foregoing background, the present invention advantageously provides a fluid monitoring and distribution apparatus for monitoring fluid distribution in heavy duty vehicles. The present invention also advantageously provides fluid monitoring and distribution and associated methods which provide data communication through data links which inhibit potentially explosive electronics being mounted in explosive sensitive areas of a vehicle and fluid metering systems. The present invention additionally provides a readily portable data communication terminal for a driver which allows the driver to walk among the potentially explosive environment with little fear of explosive potential being initiated from the data communication terminal and yet provides effective data communication between the driver, the heavy duty vehicle, fluid delivery location, and a main dispatching office. The present invention further advantageously provides an effective fluid delivery tracking and monitoring system which can be readily installed and retrofitted into existing vehicles and can also be initially installed on new vehicles in a cost effective manner.

More particularly, a system and associated methods for monitoring fluid distribution for heavy duty vehicles are provided. The system advantageously includes a first handheld RF data communications terminal. The handheld RF data terminal preferably includes a portable housing readily adapted to be positioned in the hand of a driver of a heavy duty vehicle and a first RF transceiver connected to the portable housing for transmitting and receiving RF data communications to thereby interface with a heavy duty vehicle driver to collect data from customer fluid delivery locations. The system also includes at least one heavy duty vehicle adapted to transport fluid and a second vehicle data communications terminal preferably mounted to the at least one heavy duty vehicle. The second data communications terminal preferably includes a second RF transceiver for transmitting and receiving RF data communications. The system additionally includes at least one fluid storage tank positioned at a customer fluid delivery location for receiving and storing fluid transported by the heavy duty vehicle. The fluid storage tank preferably includes tank identifying means for identifying the tank and adapted to be received by the data collection device of the first handheld data collection terminal. The system further includes a main office data monitoring and dispatching data terminal associated with a main office. The main office data terminal preferably includes a third RF transceiver for transmitting and receiving data communications to and from the vehicle data communication terminal to thereby provide dispatching instructions from a main office user to the heavy duty vehicle and the vehicle driver.

According to another aspect of the present invention, a system for monitoring fluid distribution for a fleet of heavy duty vehicles adapted to transport fluid is provided. The system preferably includes a plurality of first handheld RF data communications terminals. Each of the plurality of handheld terminals includes a portable housing readily adapted to be positioned in the hand of a driver of a heavy duty vehicle, a first RF transceiver connected to the portable housing for transmitting and receiving RF data communications, a first processor mounted in the housing for processing data communications, a first user interface connected to the processor and to an external surface of the portable housing for interfacing with a heavy duty vehicle driver, and a data collection device connected to the processor and to the portable housing for collecting data from customer fluid delivery locations.

The system also includes a fleet of heavy duty vehicles adapted to transport fluid and a plurality of second vehicle data communications terminals each mounted to one of the fleet of heavy duty vehicles. Each of the plurality of second vehicle data communications terminals preferably includes a second RF transceiver for transmitting and receiving RF data communications, a second processor for processing data communications, and a second user interface for interfacing with a driver of a heavy duty vehicle.

The system additionally preferably includes at least one fluid storage tank positioned at a customer fluid delivery location for receiving and storing fluid transported by the heavy duty vehicle. The fluid storage tank preferably includes tank identifying means for identifying the tank and adapted to be received by the data collection device of each of the plurality of first handheld data collection terminals.

The system further preferably includes a main office data monitoring and dispatching terminal associated with a main office for monitoring and dispatching fuel distribution data to the fleet of heavy duty vehicles. The main office terminal preferably includes a third RF transceiver for transmitting and receiving data communications to and from each of the plurality of second vehicle data communication terminals, a third processor connected to the third RF transceiver for processing data communications, and a third user monitoring and dispatching interface for monitoring fluid distribution data and for providing dispatching instructions from a main office user.

The present invention also advantageously includes methods of monitoring and distributing fluid to customers. A method of monitoring fluid distribution for heavy duty vehicles preferably includes providing a first handheld RF data communications terminal. The first handheld RF data communications terminal includes a first RF transceiver for transmitting and receiving data communications and a data collection device for collecting data from customer fluid delivery locations. The method also includes providing a second vehicle data communications terminal mounted to the at least one heavy duty vehicle. Each of the second data communications terminals includes a second RF transceiver for transmitting and receiving RF data communications. The method additionally includes providing at least one fluid storage tank positioned at a customer fluid delivery location for receiving and storing fluid transported by the heavy duty vehicle. The fluid storage tank preferably includes a tank identifier for identifying the tank and adapted to be received by the data collection device of the first handheld data collection terminal. The method further includes providing a main office data monitoring and dispatching terminal associated with a main office for monitoring and dispatching fuel distribution data to the at least one heavy duty vehicles. The main office terminal includes a third RF transceiver for transmitting and receiving data communications to and from the vehicle data communication terminal.

Another method of monitoring fluid distribution for heavy duty vehicles preferably includes collecting tank identifying data from at least one fluid storage tank positioned at a customer fluid delivery location with a handheld RF data communications terminal, transmitting the tank identifying data to a vehicle RF data communications terminal mounted to a heavy duty vehicle adapted to transport fluid thereon, and transmitting the tank identifying data from the vehicle data communications terminal to a main office monitoring and dispatching terminal. The main office monitoring and dispatching terminal preferably includes an RF data communications transceiver associated therewith for transmitting and receiving RF data communications.

Yet another method of monitoring fluid distribution for heavy duty vehicles preferably includes providing at least one fluid storage tank at a customer fluid delivery location. The at least one fluid storage tank includes a tank meter for metering fluid flowing to and from the tank and an RF transceiver associated with the at least one tank and responsive to the tank meter. The method also includes transmitting metering data from the RF transceiver to a handheld RF data communications terminal, transmitting metering data from the handheld RF data communications terminal to a vehicle RF data communications terminal mounted to a heavy duty vehicle adapted to transport fluid thereon, and transmitting metering data from the vehicle RF data communications terminal to a main office monitoring and dispatching terminal. The main office monitoring and dispatching terminal preferably includes an RF data communications transceiver associated therewith for transmitting and receiving data communications.

BRIEF DESCRIPTION OF THE DRAWINGS

Some of the objects and advantages of the present invention having been stated, others will become apparent as the description proceeds when taken in conjunction with the accompanying drawings in which.

DETAILED DESCRIPTION OF THE PREFERRED EMBODIMENTS

Figure 1:
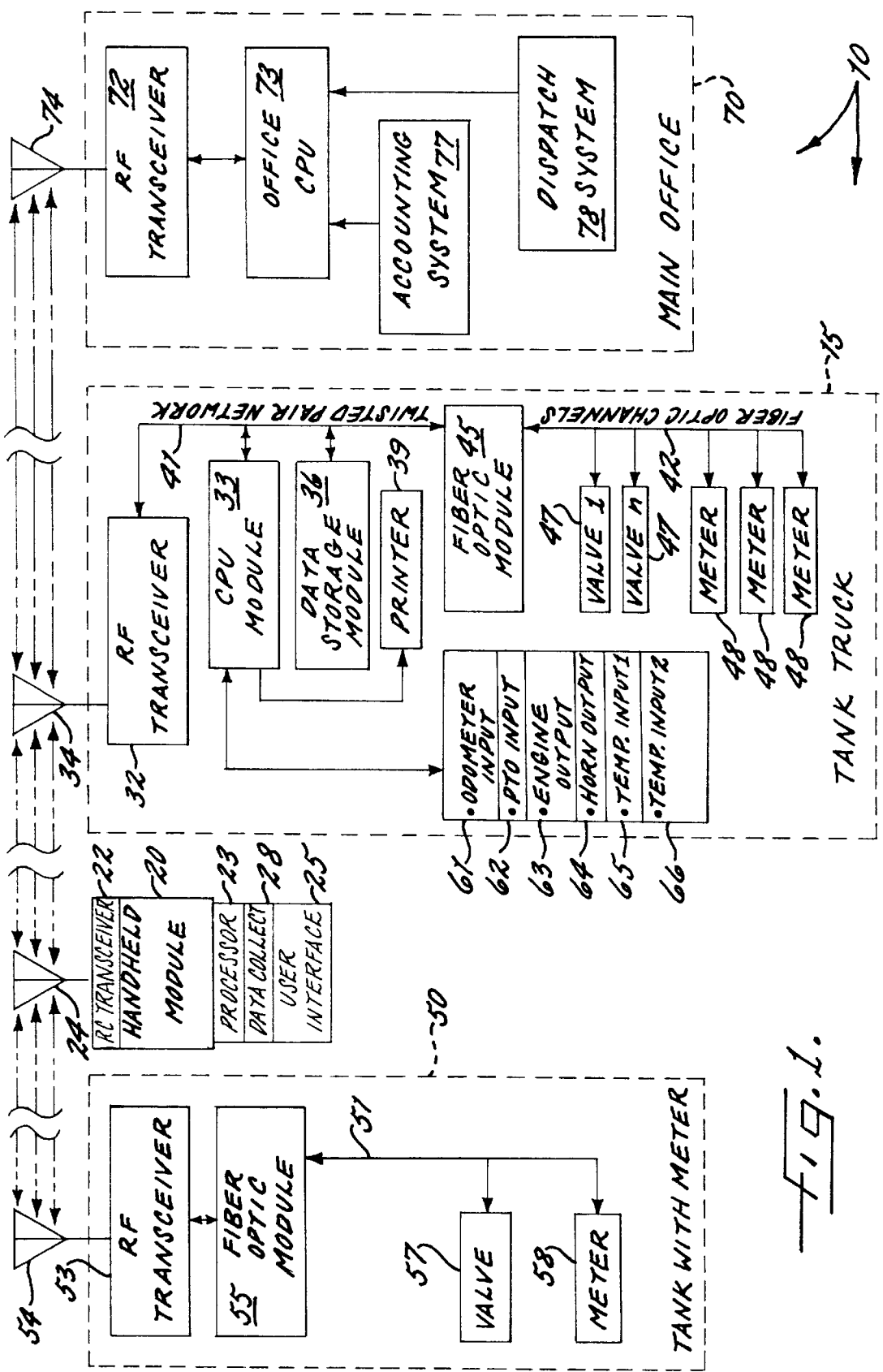
FIG. 1 is a schematic block diagram of a fluid distribution monitoring system for monitoring fluid distribution between a heavy duty vehicle, a main dispatching office, a driver of the vehicle, and a fluid distribution location according to the present invention.

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation where used indicate similar elements in alternative embodiments FIGS. 1–5 illustrate a system 10 for monitoring fluid distribution for a fleet of heavy duty vehicles 15 which are each adapted to transport fluid such as petroleum based fuels. Although illustrated, described, and advantageously used with a fleet of heavy duty vehicles 15, the present invention is also applicable to either only one heavy duty vehicle 15 or more than one heavy duty vehicle 15. Each of the heavy duty vehicles 15 is preferably a tractor 16 coupled to a trailer 18 having one or more fluid, e.g., petroleum based fuel, storage tanks 19 mounted to the trailer 18. As understood by those skilled in the art, however, various other types of heavy duty vehicles which temporarily store and transport fluid can be used as well according to the present invention.

Figure 3:
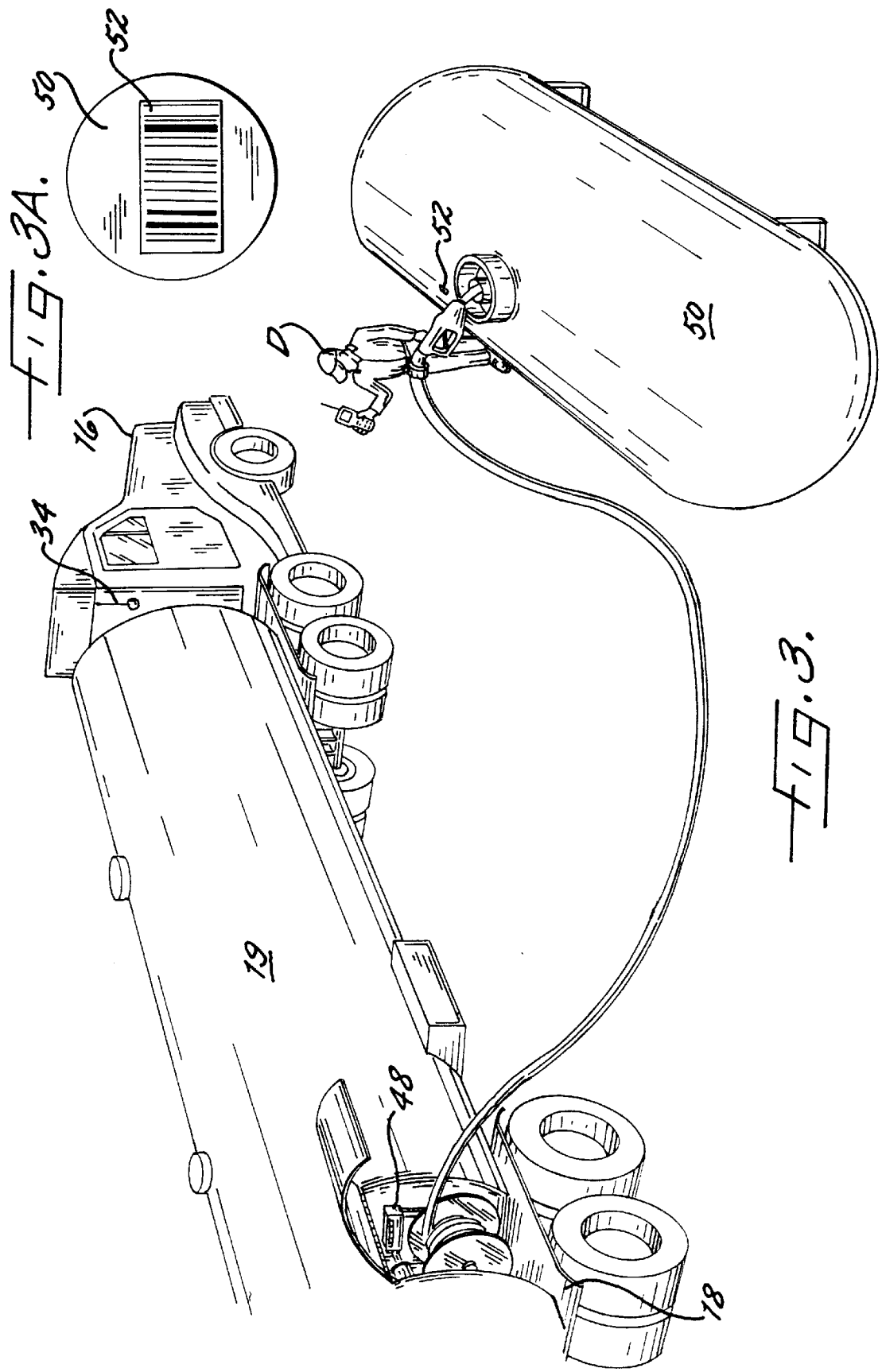
FIG. 3 is a perspective view of a fluid distribution and monitoring system being used by a driver when unloading fuel at a customer site according to a first embodiment of the present invention.
Figure 4:
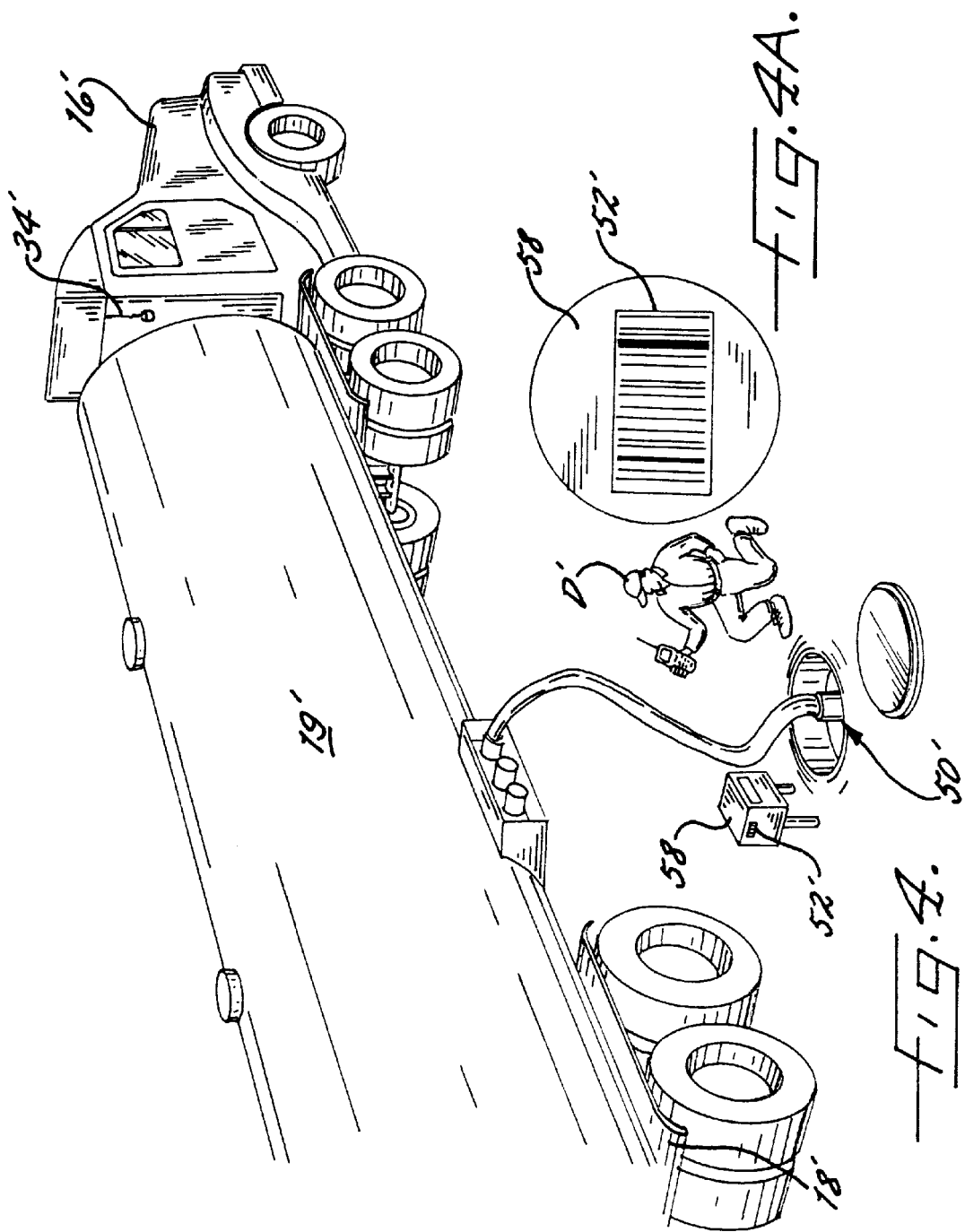
FIG. 4 is a perspective view of a fluid distribution and monitoring system being used by a driver when unloading fuel at a customer site according to a second embodiment of the present invention.
Figure 5:
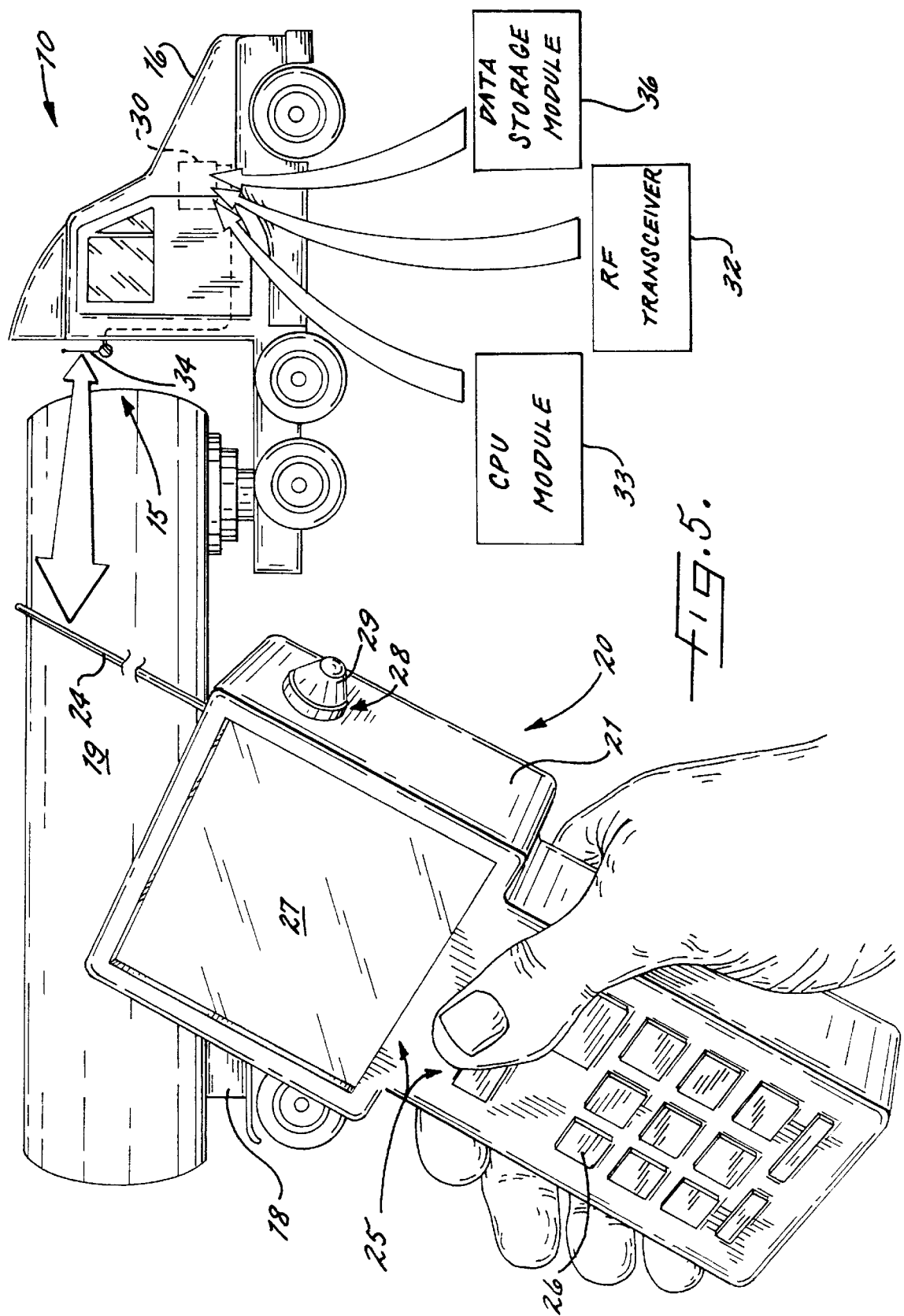
FIG. 5 is a perspective view of a portable data communication terminal for a driver and a schematic side elevational view of a heavy duty vehicle equipped with a data communication terminal of a fluid distribution monitoring system according to the present invention.

As perhaps best shown in FIGS. 3–5, the system 10 preferably includes a plurality of first handheld RF data communications terminals 20. Each of the handheld data communications terminals 20 includes a portable housing 21 readily adapted to be positioned in the hand of a driver D of a heavy duty vehicle 15. Each handheld data terminal 20 also preferably includes a first RF transceiver 22 connected to the portable housing 21 for transmitting and receiving RF data communications. The first RF transceiver 22 preferably includes an antenna 24 mounted to an external surface of the portable housing 21. A first processor 23 is mounted in the portable housing 21 for processing data communications transmitted and received by the first RF transceiver 22. A first user interface 25 is connected to the first processor 23 and to an external surface of said portable housing for interfacing with a heavy duty vehicle driver. As understood by those skilled in the art, the first user interface 25 preferably includes a keyboard 26 and a display 27 such as illustrated (see FIG. 5).

The handheld data communications terminal 20 also advantageously includes a data collection device 28 connected to the first processor 23 and to the portable housing 21 for collecting data from customer fluid delivery locations. The data collection device 28 is preferably a coded data detection device such as provided by a bar code reader and preferably includes either a contact scanning head 29 as illustrated, or a non-contact scanning head as understood by those skilled in the art, mounted to an external surface of the portable housing 21.

Figure 2:
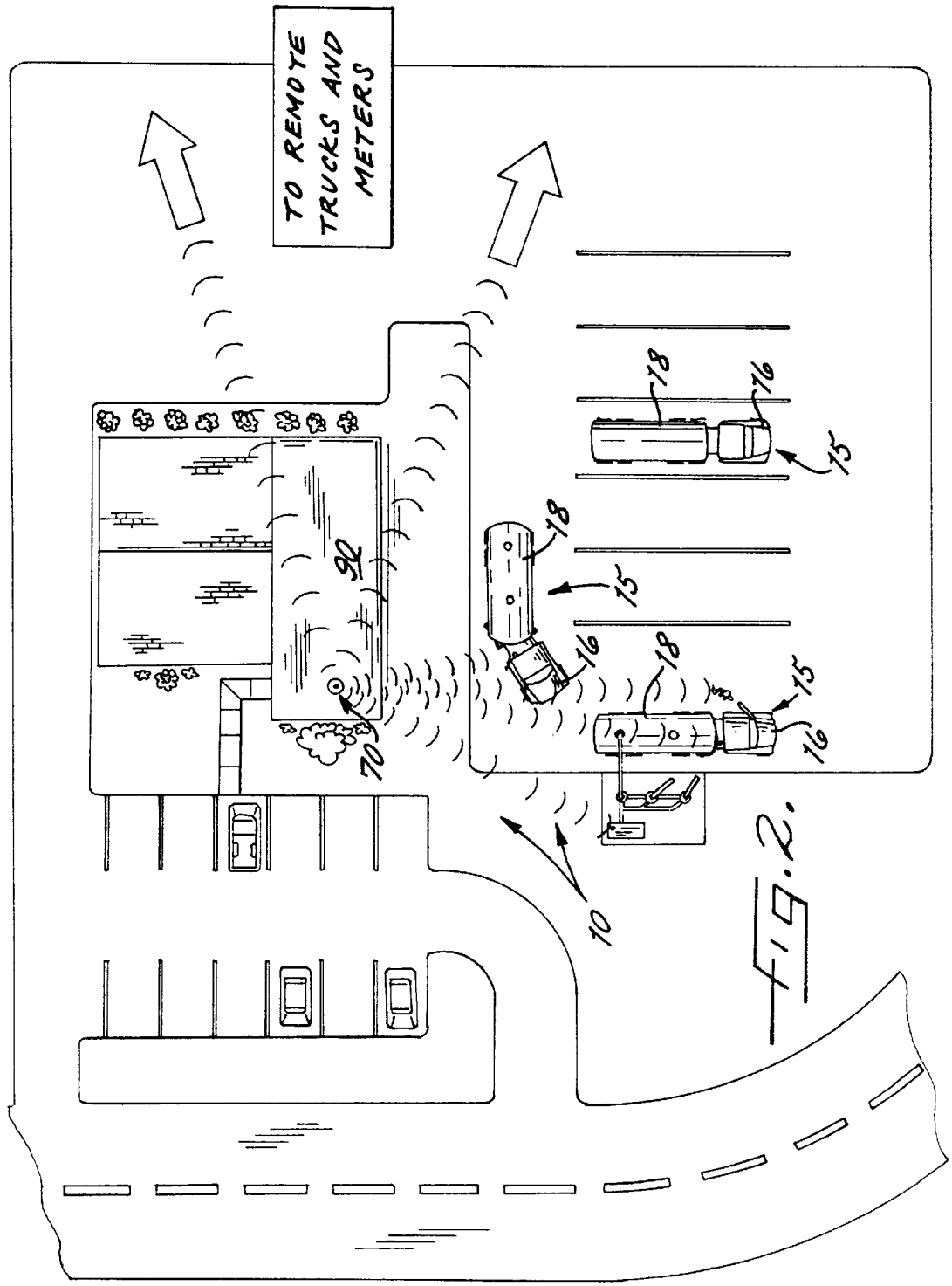
FIG. 2 is an environmental view of a fleet of heavy duty vehicles positioned in data communication with a main dispatching office and positioned for loading fuel prior to dispatch according to the present invention.

As best illustrated in FIG. 2, the system 10 preferably includes a fleet of heavy duty vehicles 15 each of which are adapted to transport fluid. As described above, the fleet of vehicles 15 is preferably provided by a plurality, e.g., two or more, of tractor/trailer combination vehicles or fluid distribution trucks as understood by those skilled in the art. The fleet of heavy duty vehicles 15 preferably have a plurality of second vehicle data communications terminals 30 each mounted to one of the heavy duty vehicles 15 of the fleet (see FIGS. 1 and 5). Each of the second data communications terminals 30 includes a second RF transceiver 32 for transmitting and receiving RF data communications and a second processor 33 for processing data communications. The second RF transceiver 32 also includes an antenna 34. The second data communications terminals 30 also include a second user interface 35, e.g., a keyboard and/or a display (not shown), preferably positioned for interfacing with a driver D of a heavy duty vehicle 15 when the driver D is positioned in the cab of the tractor 16.

As illustrated in FIGS. 3–4, the system 10 also preferably includes at least one fluid storage tank 50, e.g., a bulk storage tank positioned above or below ground, positioned at a customer fluid delivery location for receiving and storing fluid transported by a heavy duty vehicle 15. The fluid storage tank 50 preferably includes a RF transceiver 53 for transmitting and receiving data communications including an antenna 54 associated therewith, tank identifying means, e.g., an identifier 52, for identifying the tank 50 and adapted to be received by the data collection device 28 of the first handheld data collection terminal 20. The tank identifying means 52 is preferably provided by a coded data label, such as a bar code label, and can include customer information along with the tank identification.

As best illustrated in FIGS. 1–2, the system 10 further preferably includes a main office data monitoring and dispatching terminal 70 associated with a main office 90 for monitoring and dispatching fuel distribution data to the fleet or the plurality of heavy duty vehicles 15. The main office data monitoring and dispatching terminal 70 preferably includes a third RF transceiver 72 for transmitting and receiving data communications to and from each of the plurality of vehicle data communication terminals 30. The third RF transceiver 72 also preferably includes an antenna 74 associated therewith. The main office data terminal 70 also preferably includes a third processor 73 connected to the third RF transceiver 72 for processing data communications, and a third user monitoring and dispatching interface 75 for monitoring fluid distribution data and for providing dispatching instructions from a user.

As perhaps best illustrated in FIG. 1, according to other aspects of the present invention, the second processor 33 of each of the plurality of second vehicle data communications terminals 30 is preferably provided by a central processor, a central processing unit ("CPU"), a microprocessor, or other processing circuits as understood by those skilled in the art. Each of the plurality of second vehicle data communications terminals 30 further includes data storing means 36 in communication with the second RF transceiver 32 for storing data and a printer 39 connected to the CPU 33 for printing data (see FIG. 1).

Each of the second vehicle data communication terminals 30 further includes a twisted pair data communications network 41 and data communications protecting means 45 connected to the twisted pair data communications network 41 for providing protective data communications in potentially explosive environments from the twisted pair network 41 to at least one valve 47 and/or at least one meter 48 associated with the heavy duty vehicle 15 to which the second vehicle data communications terminal is mounted. The data communications protecting means 45 is preferably provided by a fiber optics data communications module. The fiber optic data communications module 45 advantageously includes at least one light emitter for emitting optical metering data and at least one light receiver for receiving the optical metering data. The fiber optic data communications module 45 is shown and described in more detail in co-pending U.S. patent application Ser. No. 08/840,571 filed on Apr. 21, 1997 and which is incorporated herein by reference in its entirety. Accordingly, for brevity and conciseness, the fiber optic data communications module is not further described herein. As understood by those skilled in the art, other immune or explosive inhibiting data communications protecting means 45 such as described and shown in this co-pending U.S. patent application can be used as well according to the present invention.

The plurality of second vehicle data communications terminals 30 further include at least one fiber optic channel 42 connected to the fiber optic data communications module 45, at least one fluid delivery valve 47 connected to the at least one fiber optic channel, and at least one meter 48 connected to the at least one fiber optic channel 42. As illustrated in FIGS. 1 and 3–4, the at least one valve 47 can be a plurality of valves, e.g., 1 to n number of valves, and the at least one meter 48 can be a plurality of meters. The second processor 33 of each of the plurality of vehicle data communication terminals 30 also preferably includes odometer monitoring means, e.g., an odometer input controller 61, for monitoring the odometer of the heavy duty vehicle, a power take off ("PTO") controlling means, e.g., a PTO input controller 62, for controlling power take off for the pump which distributes fuel, engine controlling means, e.g., an engine output controller 63, for controlling the vehicle engine, temperature monitoring means, e.g., temperature input monitors 65, 66, for monitoring at least one system temperature, and horn controlling means, e.g., a horn controller 64, for controlling the horn of the vehicle.

Additionally, as illustrated in FIG. 1, the data communications protecting means 45 associated with each heavy duty vehicle 15 preferably provides only first data communications protecting means. The fluid storage tank 50 preferably further includes a fourth RF transceiver 52 and second data communications protecting means 55 connected to the fourth RF transceiver 52 and at least one meter 58 for providing protective data communications between the fourth RF transceiver 52 and the at least one meter 58 in a potentially explosive environment. The second data communications means 55 can also provide secure data communications to and from at least one valve 57 as well. The second data communications protecting means 55 is also preferably a fiber optic module such as illustrated and described in U.S. patent application Ser. No. 08/840,571 filed on Apr. 21, 1997. The fiber optic module 55 preferably includes at least one optical emitter for emitting optical metering data and at least one optical receiver responsive to the at least one optical emitter for receiving optical metering data.

Further, the third processor 73 of the main office monitoring and dispatching terminal 70 includes accounting means 77 for accounting customer order data, the customer order data including fluid product-type pricing and dispatching means 78 for providing dispatching instruction data to a vehicle driver D. The dispatching means 78 preferably includes trip delivery organizing means for organizing individual trips for predetermined ones of the fleet of heavy duty vehicles responsive to customer location, fluid product-type, and required delivery date to thereby define fleet routing instructions. The fleet routing instructions, in turn, preferably include individual vehicle routing instructions. The individual routing instructions are transmitted from the third RF transceiver to the second RF transceiver of each of the plurality of vehicle data communication terminals 30 and are transmitted from the second RF transceiver to the first RF transceiver 22 of each of the plurality of first handheld data communications terminals 20.

The first processor 23 of each of the plurality of first handheld data communications terminals 20 also includes vehicle inspecting means responsive to the individual routing instructions for providing vehicle inspecting instructions to a vehicle driver D. The vehicle inspecting means is preferably provided by an interactive software program, as understood by those skilled in the art, which preferably includes the driver D answering a series of questions about the condition of all critical vehicle subsystems by interfacing with the user interface 25 of the handheld RF data communications terminal 20 and the recording of the results by sending them to the data storing means of the vehicle data communications terminal 30. The vehicle inspecting instructions, in other words, are transmitted to the vehicle data communications terminal 30 of a corresponding one of the fleet of heavy duty vehicles 15 responsive to the vehicle driver D.

The system 10 for monitoring fluid distribution, as illustrated in FIGS. 1–5, preferably operates according to the following description. In the main office 90, for example, customer order data is entered into account tracking means, e.g., preferably provided by an accounting system 77. The accounting system 77 transfers the customer order data to dispatching means 78, e.g., preferably provided by a dispatch system, a dispatch operation, or a dispatcher. The dispatcher 78 organizes the customer orders into "runs", or individual trips for specific trucks or other heavy duty vehicles. This organization is preferably based upon priority, customer location (routing), product type, and required delivery date.

When requested by the driver D, the customer order date, routing instructions, product information, and pricing information are loaded from the dispatcher 78 into the heavy duty vehicle's data storage module 36 via the RF transceivers 72, 32. The customer order date, routing instructions, and product information are then loaded into the handheld data terminal 20 from the data storage module 36 associated with the heavy duty vehicle 15 via the RF transceivers 32, 22.

When the data transfer to the handheld data terminal 20 is complete, the vehicle driver D preferably is then prompted by the user interface 25 of the handheld data terminal 20 to perform an inspection of the truck 15. The vehicle driver D answers a series of questions about the condition of all critical truck subsystems, and records the results by sending them to the vehicle data storage module 36 via the RF transceiver 32. The central processing unit ("CPU") 33 of the vehicle data terminal 30 then evaluates the inspection results, stores the results in the data storage module 36 thereof, and prints a record over a vehicle printer 39.

If the heavy duty vehicle 15 or truck passes inspection, the vehicle driver D is prompted to load products required by the customer order. If the truck 15 does not pass inspection, the driver D is prompted to re-inspect the truck 15 after repairs have been made. As the driver D loads product, the product type, the amount, and the compartment into which the product is being loaded is recorded in the data storage module 36. When the loading is completed, the bill of lading number and the supplier product identification are entered by the driver D and transferred to the data storage module 36 via the RF transceiver 32. A record is also printed over the truck printer 39.

The handheld data communications terminal 20 then presents the driver D with a list of customer locations to which the driver D is to deliver product. When the driver D arrives at the customer's location, the driver D selects that customer from the list, and the handheld data terminal 20 displays any special instructions for that customer. After the driver D reads the instructions, the handheld data terminal 20 retrieves a list of the individual tanks 50 to be filled on the customer's order from the data storage module 36 using the RF transceivers 22, 32.

The driver D is then prompted by the handheld data terminal 20 to scan a bar code 52 that has been previously placed on the customer's tank. The data from the bar code reader 28 is compared to the previously retrieved list. If the scanned tank 50 is found in the list, then the handheld data terminal 20 sends the identification of the scanned tank 50 to the CPU 33 using the RF transceivers 22, 32. The driver D is told which valve or valves will deliver the product to the tank 50.

If the scanned tank 50 is not found on the list, a warning is preferably posted on the display of the handheld data terminal 20. If the driver D chooses to deliver the unrecognized tank 50, the scanned identification is recorded, along with product type, the amount delivered, and the time of delivery. The valves 47 preferably are continuously monitored by fiber optic channels 42. When a valve 47 is opened, the CPU 33 is notified by the fiber optic module 45 over the twisted pair network 41.

The CPU 33 then compares the product type of the valve 47 which was actually opened by the driver D with the product type associated with the tank 50 that was scanned. As will be understood by those skilled in the art, the CPUs 23, 33, 73 preferably operate various functions as described herein under stored program control, including the accounting system and dispatch system as well. If they do not match, the driver D is warned by a message sent from the CPU 33 over the second RF transceiver 32 to the handheld data terminal 20, and prompted to close the improper valve 47. If the valve 47 is not closed, a warning horn is sounded by use of the horn controller 64. If the product type matches, on the other hand, the CPU 33 sends a "start pumping" message over the second RF transceiver 32 to the handheld data terminal 20. The driver D is presented with a screen by the interface 25 showing the total capacity of the tank 50 being serviced and a real time display of the amount of product pumped.

The flow meters 48 preferably are also continuously monitored by the fiber optic module 45 through the fiber optic channels 42. The channels 42 send data to the CPU 33 via the twisted pair network 41 associated with the vehicle 15. From there, the amount of product pumped is recorded in the delivery record on the data storage module 36 and sent to the handheld data terminal 20 via the second RF transceiver 32 to update the real time display. When the driver D indicates that the delivery is complete, the CPU 33 time stamps the delivery record in the data storage module 36 and marks the tank 50 as delivered. At this time, the driver D preferably is prompted to enter the odometer or hour meter reading associated with the tank 50, if relevant.

The driver D is then prompted to scan the next tank 50, or complete the customer transaction if the last tank 50 of fluid has been delivered. Once the customer transaction has been completed, a record of the completed transaction, including pricing, is recorded and printed over the vehicle printer 39. When all of the customers have been serviced, and the driver D returns the truck 15 to the yard, the driver D initiates an "end of run" through the handheld data terminal 20. At this point, the CPU module 33 contacts or communicates with the dispatcher or dispatch system 78 over the second and third RF transceivers 32, 72. The CPU 33 also requests that collected data be uploaded from the truck or heavy duty vehicle 15.

The dispatch system 78 then preferably retrieves the data from the data storage module 36 over the third RF transceiver 72. The data retrieved, for example, can include: (1) the amount and types of product that were loaded on the truck 15; (2) the bill of lading under which the product was loaded; (3) how much product remains on the truck 15 and in which truck compartment location; (4) which customers were visited; (5) which fluid storage tanks 50 were visited; (6) the time of the visit; (7) how much product was delivered to each tank 50; (8) the hour or odometer reading at each tank 50; (9) the time the vehicle driver D spent driving; (10) the time the vehicle driver D spent loading; (11) the time the driver D spent delivery product; and (12) the results of the inspections performed on the truck 15.

The following items, for example, can be monitored continuously by the heavy duty vehicle 15: (1) the odometer, to detect when the truck is moving as opposed to idling; (2) The PTO's to detect when the truck is in the pumping mode; (3) the valves 47, for various operations, including monitoring improper opening; and (4) the flow meters 48, for various operations, including monitoring improper pumping.

The dispatch system 78 preferably stores data in a database associated therewith. The dispatch system 48 also sends the appropriate data back to the accounting system 77 through the CPU 73 for invoice generation. The information is also available on the dispatch system 78 for report generation.

As further illustrated in FIGS. 1–5, the present invention also preferably includes methods of monitoring and distributing fluid to customers. A method of monitoring fluid distribution for heavy duty vehicles 15 preferably includes providing a first handheld RF data communications terminal 20. The first handheld RF data communications terminal 20 preferably includes a first RF transceiver 22 for transmitting and receiving data communications and a data collection device 28 for collecting data from customer fluid delivery locations. The method also includes providing a second vehicle data communications terminal 30 mounted to the at least one heavy duty vehicle 15. Each of the second data communications terminals 30 includes a second RF transceiver 32 for transmitting and receiving RF data communications. The method additionally includes providing at least one fluid storage tank 50 positioned at a customer fluid delivery location for receiving and storing fluid transported by the heavy duty vehicle 15. The fluid storage tank 50 preferably includes a tank identifier 52 for identifying the tank 50 and adapted to be received by the data collection device 28 of the first handheld data collection terminal 20. The method further includes providing a main office data monitoring and dispatching terminal 70 associated with a main office 90 for monitoring and dispatching fuel distribution data to the at least one heavy duty vehicle 15. The main office terminal 70 includes a third RF transceiver 72 for transmitting and receiving data communications to and from the vehicle data communication terminal 30.

The method can also include collecting tank identifying data from the at least one tank 50 with the first handheld RF data communications terminal 20 and transmitting the tank identifying data to the second vehicle data communications terminal 30. The at least one tank 50 further preferably includes a tank meter 58 for metering fluid flowing to and from the tank 50 and a fourth RF transceiver 53 associated with the at least one tank 50 and responsive to the tank meter 58. The method can further include transmitting metering data from the fourth RF transceiver 53 to the first RF transceiver 22 of the first handheld data communications terminal 20, transmitting metering data from the first RF transceiver 22 to the second RF transceiver 32 of the second vehicle data communications terminal 30, and transmitting metering data from the second RF transceiver 32 to the third RF transceiver 72 of the main office data monitoring and dispatching terminal 70.

Another method of monitoring fluid distribution for heavy duty vehicles 15 preferably includes collecting tank 50 identifying data from at least one fluid storage tank 50 positioned at a customer fluid delivery location with a handheld RF data communications terminal 20, transmitting the tank identifying data to a vehicle RF data communications terminal 30 mounted to a heavy duty vehicle 15 adapted to transport fluid thereon, and transmitting the tank identifying data from the vehicle data communications terminal 30 to a main office monitoring and dispatching terminal 70. The main office monitoring and dispatching terminal 70 preferably includes an RF data communications transceiver 72 associated therewith for transmitting and receiving RF data communications.

The at least one fluid storage tank 50 can advantageously have a tank meter 58 for metering fluid flowing to and from the tank 50 and an RF transceiver 53 associated with the at least one tank 50 and responsive to the tank meter 58. The method can further include transmitting metering data from the RF transceiver 53 to the handheld RF data communications terminal 20, transmitting metering data from the handheld data communications terminal 20 to the vehicle RF data communications terminal 30, and transmitting metering data from the vehicle RF data communications terminal 30 to the main office monitoring and dispatching terminal 70.

Yet another method of monitoring fluid distribution for heavy duty vehicles 15 preferably includes providing at least one fluid storage tank 50 at a customer fluid delivery location. The at least one fluid storage tank 50 preferably includes a tank meter 58 for metering fluid flowing to and from the tank 50 and an RF transceiver 53 associated with the at least one tank 50 and responsive to the tank meter 58. The method also includes transmitting metering data from the RF transceiver 53 to a handheld RF data communications terminal 20, transmitting metering data from the handheld RF data communications terminal 20 to a vehicle RF data communications terminal mounted to a heavy duty vehicle 15 adapted to transport fluid thereon, and transmitting metering data from the vehicle RF data communications terminal 30 to a main office monitoring and dispatching terminal 70. The main office monitoring and dispatching terminal 70 preferably includes an RF data communications transceiver 72 associated therewith for transmitting and receiving data communications.

The method can also advantageously include collecting tank identifying data from at least one tank 50 with the handheld RF data communications terminal 20 and transmitting the tank identifying data to the vehicle RF data communications terminal 30. The method can further include transmitting the tank identifying data from the vehicle RF data communications terminal 30 to the main office monitoring and dispatching terminal 70.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A system for monitoring fluid distribution for a fleet of heavy duty vehicles adapted to transport fluid, the system comprising:

a plurality of first handheld RF data communications terminals, each of said plurality of handheld terminals including a portable housing readily adapted to be positioned in the hand of a driver of a heavy duty vehicle, a first RF transceiver connected to said portable housing for transmitting and receiving RF data communications, a first processor mounted in said housing for processing data communications, a first user interface connected to said processor and to an external surface of said portable housing for interfacing with a heavy duty vehicle driver, and a data collection device connected to said processor and to said portable housing for collecting data from customer fluid delivery locations;

a fleet of heavy duty vehicles adapted to transport fluid;

a plurality of second vehicle data communications terminals each mounted to one of the fleet of heavy duty vehicles, each of said plurality of second vehicle data communications terminals including a second RF transceiver for transmitting and receiving RF data communications, a second processor for processing data communications, and a second user interface for interfacing with a driver of a heavy duty vehicle;

at least one fluid storage tank positioned at a customer fluid delivery location for receiving and storing fluid transported by the heavy duty vehicle, the fluid storage tank including tank identifying means for identifying the tank and adapted to be received by said data collection device of each of said plurality of first handheld data collection terminals; and a main office data monitoring and dispatching terminal associated with a main office for monitoring and dispatching fuel distribution data to the fleet of heavy duty vehicles, said main office terminal including a third RF transceiver for transmitting and receiving data communications to and from each of the plurality of second vehicle data communication terminals, a third processor connected to said third RF transceiver for processing data communications, and a third user monitoring and dispatching interface for monitoring fluid distribution data and for providing dispatching instructions from a main office user.

2. A system as defined in claim 1, wherein said second processor of each of said plurality of second vehicle data communications terminals comprises a central processor, and wherein each of said plurality of second vehicle data communications terminals further includes data storing means in communication with said second RF transceiver for storing data and a printer connected to said central processor for printing data.

3. A system as defined in claim 2, wherein each of said second vehicle data communication terminals further includes a twisted pair data communications network and data communications protecting means connected to said twisted pair data communications network for providing protective data communications in potentially explosive environments from said twisted pair network to at least one valve or at least one meter associated with said heavy duty vehicle to which said second vehicle data communications terminal is mounted.

4. A system as defined in claim 3, wherein said data communications protecting means includes a fiber optics data communications module, said fiber optic data communications module including at least one light emitter for emitting optical metering data and at least one light receiver for receiving the optical metering data.

5. A system as defined in claim 4, wherein each of said plurality of second vehicle data communications terminals further comprises at least one fiber optic channel connected to said fiber optic data communications module, at least one fluid delivery valve connected to the at least one fiber optic channel, and at least one meter connected to the at least one fiber optic channel.

6. A system as defined in claim 1, wherein said second processor of each of said plurality of vehicle data communication terminals includes odometer monitoring means for monitoring the odometer of the heavy duty vehicle, engine controlling means for controlling the vehicle engine, temperature monitoring means form monitoring at least one system temperature, and horn controlling means for controlling the horn of the vehicle.

7. A system as defined in claim 3, wherein said data communications protecting means comprises first data communications protecting means, and wherein the at least one fluid storage tank further includes a fourth RF transceiver and second data communications protecting means connected to said fourth RF transceiver and at least one meter for providing protective data communications between said fourth RF transceiver and the at least one meter in a potentially explosive environment.

8. A system as defined in claim 7, wherein said second data communications protecting means includes a fiber optic module, said fiber optic module including at least one optical emitter for emitting optical metering data and at least one optical receiver responsive to the at least one optical emitter for receiving optical metering data.

9. A system as defined in claim 1, wherein said third processor includes accounting means for accounting customer order data, the customer order data including fluid product-type pricing; and wherein said third processor includes dispatching means for providing dispatching instruction data to a vehicle driver.

10. A system as defined in claim 9, wherein said dispatching means includes trip delivery organizing means for organizing individual trips for predetermined ones of said fleet of heavy duty vehicles responsive to customer location, fluid product-type, and required delivery date to thereby define fleet routing instructions.

11. A system as defined in claim 10, wherein the fleet routing instructions include individual vehicle routing instructions, the individual routing instructions being transmitted from said third RF transceiver to said second RF transceiver of each of said plurality of vehicle data communication terminals and being transmitted from said second RF transceiver to said first RF transceiver of each of said plurality of first handheld data communications terminals.

12. A system as defined in claim 11, wherein said first processor of each of said plurality of first handheld data communications terminal includes vehicle inspecting means responsive to the individual routing instructions for providing vehicle inspecting instructions to a vehicle driver, the vehicle inspecting instructions being transmitted to said vehicle data communications terminal of a corresponding one of said fleet of heavy duty vehicles responsive to the vehicle driver.

13. A system for monitoring fluid distribution for heavy duty vehicles adapted to transport fluid, the system comprising:
 a first handheld RF data communications terminal including a portable housing readily adapted to be positioned in the hand of a driver of a heavy duty vehicle, a first RF transceiver connected to said portable housing for transmitting and receiving RF data communications, a first processor mounted in said housing for processing data communications, a first user interface connected to said first processor and to an external surface of said portable housing for interfacing with a heavy duty vehicle driver, and a data collection device connected to said processor and to said portable housing for collecting data from customer fluid delivery locations;
 at least one heavy duty vehicle adapted to transport fluid;
 a second vehicle data communications terminal mounted to the at least one heavy duty vehicle, the second data communications terminal including a second RF transceiver for transmitting and receiving RF data communications, a second processor for processing data communications, and a second user interface for interfacing with a driver of a heavy duty vehicle;
 at least one fluid storage tank positioned at a customer fluid delivery location for receiving and storing fluid transported by the heavy duty vehicle, the fluid storage tank including tank identifying means for identifying the tank and adapted to be received by said data collection device of said first handheld data collection terminal; and
 a main office data monitoring and dispatching terminal associated with a main office for monitoring and dispatching fuel distribution data to the at least one heavy duty vehicle, said main office terminal including a third RF transceiver for transmitting and receiving data communications to and from the vehicle data communication terminal, a third processor connected to said third RF transceiver for processing data communications, and a third user monitoring and dispatching interface for monitoring fluid distribution data and for providing dispatching instructions from a main office user.

14. A system as defined in claim 13, wherein said second processor of said second vehicle data communications terminal comprises a central processor, and wherein said second vehicle data communications terminals further includes data storing means in communication with said second RF transceiver for storing data and a printer connected to said central processor for printing data.

15. A system as defined in claim 14, wherein said second vehicle data communication terminal further includes a twisted pair data communications network and data communications protecting means connected to said twisted pair data communications network for providing protective data communications in potentially explosive environments from said twisted pair network to at least one valve or at least one meter associated with said heavy duty vehicle to which said second vehicle data communications terminal is mounted.

16. A system as defined in claim 15, wherein said data communications protecting means includes a fiber optics data communications module, said fiber optic data communications module including at least one light emitter for emitting optical metering data and at least one light receiver for receiving the optical metering data.

17. A system as defined in claim 16, wherein said second vehicle data communications terminal further comprises at least one fiber optic channel connected to said fiber optic data communications module, at least one fluid delivery valve connected to the at least one fiber optic channel, and at least one meter connected to the at least one fiber optic channel.

18. A system as defined in claim 17, wherein said second processor of each of said vehicle data communication terminal includes odometer monitoring means for monitoring the odometer of the heavy duty vehicle, engine controlling means for controlling the vehicle engine, temperature monitoring means form monitoring at least one system temperature, and horn controlling means for controlling the horn of the vehicle.

19. A system as defined in claim 18, wherein said data communications protecting means comprises first data communications protecting means, and wherein the at least one fluid storage tank further includes a fourth RF transceiver and second data communications protecting means connected to said fourth RF transceiver and at least one meter for providing protective data communications between said fourth RF transceiver and the at least one meter in a potentially explosive environment.

20. A system as defined in claim 19, wherein said second data communications protecting means includes a fiber optic module, said fiber optic module including at least one optical emitter for emitting optical metering data and at least one optical receiver responsive to the at least one optical emitter for receiving optical metering data.

21. A system as defined in claim 20, wherein said third processor includes accounting means for accounting customer order data, the customer order data including fluid product-type pricing; and wherein said third processor includes dispatching means for providing dispatching instruction data to a vehicle driver.

22. A system as defined in claim 21, wherein said dispatching means includes trip delivery organizing means for organizing individual trips for predetermined ones of said fleet of heavy duty vehicles responsive to customer location, fluid product-type, and required delivery date to thereby define fleet routing instructions.

23. A system as defined in claim 22, wherein the fleet routing instructions include individual vehicle routing instructions, the individual routing instructions being transmitted from said third RF transceiver to said second RF transceiver of each of said plurality of vehicle data communication terminals and being transmitted from said second RF transceiver to said first RF transceiver of each of said plurality of first handheld data communications terminals.

24. A system as defined in claim 23, wherein said first processor of each of said plurality of first handheld data communications terminal includes vehicle inspecting means responsive to the individual routing instructions for providing vehicle inspecting instructions to a vehicle driver, the vehicle inspecting instructions being transmitted to said vehicle data communications terminal of a corresponding one of said fleet of heavy duty vehicles responsive to the vehicle driver.

25. A method of monitoring fluid distribution for heavy duty vehicles, the method comprising the steps of:
providing a first handheld RF data communications terminal, the first handheld RF data communications terminal including a first RF transceiver for transmitting and receiving data communications and a data collection device for collecting data from customer fluid delivery locations;
providing a second vehicle data communications terminal mounted to at least one heavy duty vehicle, each of the second data communications terminals including a second RF transceiver for transmitting and receiving RF data communications;
providing at least one fluid storage tank positioned at a customer fluid delivery location for receiving and storing fluid transported by the heavy duty vehicle, the fluid storage tank including a tank identifier for identifying the tank and adapted to be received by the data collection device of the first handheld data collection terminal; and
providing a main office data monitoring and dispatching terminal associated with a main office for monitoring and dispatching fuel distribution data to the at least one heavy duty vehicles, the main office terminal including a third RF transceiver for transmitting and receiving data communications to and from the vehicle data communication terminal.

26. A method as defined in claim 25, further comprising collecting tank identifying data from the at least one tank with the first handheld RF data communications terminal.

27. A method as defined in claim 26, further comprising transmitting the tank identifying data to the second vehicle data communications terminal.

28. A method as defined in claim 25, wherein the at least one tank further includes a tank meter for metering fluid flowing to and from the tank and a fourth RF transceiver associated with the at least one tank and responsive to the tank meter, and wherein the method further comprises transmitting metering data from the fourth RF transceiver to the first RF transceiver of the first handheld data communications terminal.

29. A method as defined in claim 28, further comprising transmitting metering data from the first RF transceiver to the second RF transceiver of the second vehicle data communications terminal.

30. A method as defined in claim 29, further comprising transmitting metering data from the second RF transceiver to the third RF transceiver of the main office data monitoring and dispatching terminal.

31. A method of monitoring fluid distribution for heavy duty vehicles, the method comprising the steps of:
collecting tank identifying data from at least one fluid storage tank positioned at a customer fluid delivery location with a handheld RF data communications terminal;
transmitting the tank identifying data to a vehicle RF data communications terminal mounted to a heavy duty vehicle adapted to transport fluid thereon; and
transmitting the tank identifying data from the vehicle data communications terminal to a main office monitoring and dispatching terminal, the main office monitoring and dispatching terminal including an RF data communications transceiver associated therewith for transmitting and receiving RF data communications.

32. A method as defined in claim 31, wherein the at least one fluid storage tank includes a tank meter for metering fluid flowing to and from the tank and an RF transceiver associated with the at least one tank and responsive to the tank meter, and wherein the method further comprises transmitting metering data from the RF transceiver to the handheld RF data communications terminal.

33. A method as defined in claim 32, further comprising transmitting metering data from the handheld data communications terminal to the vehicle RF data communications terminal.

34. A method as defined in claim 33, further comprising transmitting metering data from the vehicle data communications terminal to the main office monitoring and dispatching terminal.

35. A method of monitoring fluid distribution for heavy duty vehicles, the method comprising the steps of:
providing at least one fluid storage tank at a customer fluid delivery location, the at least one fluid storage tank including a tank meter for metering fluid flowing to and from the tank and an RF transceiver associated with the at least one tank and responsive to the tank meter;
transmitting metering data from the RF transceiver to a handheld RF data communications terminal;
transmitting metering data from the handheld data communications terminal to a vehicle RF data communications terminal mounted to a heavy duty vehicle adapted to transport fluid thereon; and
transmitting metering data from the vehicle data communications terminal to a main office monitoring and dispatching terminal, the main office monitoring and dispatching terminal including an RF data communications transceiver associated therewith for transmitting and receiving data communications.

36. A method as defined in claim 35, further comprising collecting tank identifying data from at least one tank with the handheld RF data communications terminal and transmitting the tank identifying data to the vehicle RF data communications terminal.

37. A method as defined in claim 36, further comprising transmitting the tank identifying data from the vehicle RF data communications terminal to the main office monitoring and dispatching terminal.

* * * * *

UNITED STATES PATENT AND TRADEMARK OFFICE
CERTIFICATE OF CORRECTION

PATENT NO. : 6,047,250
DATED : April 4, 2000
INVENTOR(S) : Beaudoin et al.

Page 1 of 2

It is certified that error appears in the above-identified patent and that said Letters Patent is hereby corrected as shown below:

| | |
|---|---|
| Column 4, lines 34 - 35 | Between ";" and "FIG. 4", insert the following: --FIG. 3A is an enlarged top plan view of an example of an identifier for a tank of a first embodiment of a fluid distribution monitoring system according to the present invention;-- |
| Column 4, lines 39 - 40 | Between "and" and "FIG. 5", insert the following: -- FIG. 4A is an enlarged top plan view of an example of an identifier for a tank of a second embodiment of a fluid distribution monitoring system according to the present invention; -- |
| Column 5, line 54 | Delete "FIGS. 3-4" Insert -- FIGS. 3, 3A, 4, and 4A -- therefor |

UNITED STATES PATENT AND TRADEMARK OFFICE
CERTIFICATE OF CORRECTION

PATENT NO. : 6,047,250
DATED : April 4, 2000
INVENTOR(S) : Beaudoin et al.

It is certified that error appears in the above-identified patent and that said Letters Patent is hereby corrected as shown below:

Column 6, line 59

Delete "and 3-4"
Insert -- ,3, 3A, 4, and 4A -- therefor

Signed and Sealed this

Fifteenth Day of May, 2001

Attest:

NICHOLAS P. GODICI

Attesting Officer

Acting Director of the United States Patent and Trademark Office